United States Patent
Hoeeg et al.

(10) Patent No.: US 10,378,516 B2
(45) Date of Patent: Aug. 13, 2019

(54) BOLT CONNECTION FOR A TOWER OF A WIND TURBINE

(71) Applicant: SIEMENS AKTIENGESELLSCHAFT, München (DE)

(72) Inventors: Christian Elkjaer Hoeeg, Tilst (DK); Martin Johan Smith Jensen, Børkop (DK)

(73) Assignee: SIEMENS GAMESA RENEWABLE ENERGY A/S (DE)

( * ) Notice: Subject to any disclaimer, the term of this patent is extended or adjusted under 35 U.S.C. 154(b) by 0 days.

(21) Appl. No.: 15/657,249

(22) Filed: Jul. 24, 2017

(65) Prior Publication Data
US 2018/0030959 A1     Feb. 1, 2018

(30) Foreign Application Priority Data
Jul. 27, 2016 (EP) .................................. 16181486

(51) Int. Cl.
*E02D 27/42* (2006.01)
*E02D 27/02* (2006.01)
(Continued)

(52) U.S. Cl.
CPC ........... *F03D 13/20* (2016.05); *E02D 27/425* (2013.01); *E04H 12/085* (2013.01); *F03D 13/22* (2016.05);
(Continued)

(58) Field of Classification Search
CPC ....... F03D 13/20; F03D 13/22; E02D 27/425; E02D 27/42; E02D 27/50; E02D 27/02;
(Continued)

(56) References Cited

U.S. PATENT DOCUMENTS

| 915,643 A | 3/1909 | Wilson |
| 2,138,176 A * | 11/1938 | Keys ..................... F16F 1/3814 248/613 |

(Continued)

FOREIGN PATENT DOCUMENTS

| CN | 103938647 A | 7/2014 |
| EP | 2636899 A1 | 9/2013 |

(Continued)

OTHER PUBLICATIONS

Chinese Office Action dated Nov. 8, 2018 for Application No. 201710623835.6.

*Primary Examiner* — Phi D A
(74) *Attorney, Agent, or Firm* — Schmeiser, Olsen & Watts LLP.

(57) ABSTRACT

A bolt connection of a tower for a wind turbine is provided, the bolt connection including a tower base module with a tower flange, wherein the tower flange forms the bottom end of the tower, a base flange for connecting the tower base module with a foundation, wherein the base flange includes a traverse bore, and a bolt which extends through the traverse bore of the base flange, wherein the bolt includes a bolt head which is arranged at the bottom side of the base flange facing the foundation. The bolt connection further includes a clamping element which at least partially covers the bolt head. The clamping element presses the bolt head against the bottom side of the base flange.

11 Claims, 3 Drawing Sheets

(51) Int. Cl.
  *F03D 13/20* (2016.01)
  *E04H 12/08* (2006.01)
  *E04H 12/22* (2006.01)

(52) U.S. Cl.
  CPC .......... *E02D 27/42* (2013.01); *E04H 12/2215* (2013.01); *E04H 12/2261* (2013.01); *F05B 2230/60* (2013.01); *F05B 2240/91* (2013.01); *F05B 2260/301* (2013.01); *Y02E 10/728* (2013.01); *Y02P 70/523* (2015.11)

(58) Field of Classification Search
  CPC .............. E04H 12/085; E04H 12/2261; E04H 12/2276; E04H 12/2269; E04H 12/2215; E04H 12/22; E04H 12/2223; E04H 12/2292; F05B 2260/301; F05B 2230/60; F05B 2240/91; Y02E 10/728; Y02P 70/523
  USPC .................. 411/119, 113, 965, 120, 121
  See application file for complete search history.

(56) References Cited

U.S. PATENT DOCUMENTS

| | | | | |
|---|---|---|---|---|
| 2,401,824 A * | 6/1946 | Gladden | ............... | F16B 37/044 188/68 |
| 2,404,372 A * | 7/1946 | Hallock | ................ | F16B 37/044 411/103 |
| 2,409,907 A * | 10/1946 | Shakesby | ................ | B60K 15/04 220/DIG. 4 |
| 2,495,037 A | 1/1950 | Tinnerman | | |
| 2,605,806 A * | 8/1952 | Tinnerman | ............ | F16B 37/044 220/3.5 |
| 2,644,502 A * | 7/1953 | Tinnerman | ............ | F16B 37/044 411/107 |
| 2,748,906 A * | 6/1956 | Flora | ....................... | F16B 2/241 403/256 |
| 2,867,258 A * | 1/1959 | Flora | ..................... | F16B 37/044 178/17 R |
| 3,279,518 A * | 10/1966 | Bollinger | ................ | F16B 21/09 411/166 |
| 3,430,674 A * | 3/1969 | Forbush | ................ | F16B 21/09 411/107 |
| 4,500,240 A * | 2/1985 | Moran | ................ | F16B 41/002 411/103 |
| 4,524,986 A * | 6/1985 | Ward | ..................... | B62D 25/18 280/851 |
| 4,719,724 A | 1/1988 | Ditcher | | |
| 4,748,718 A * | 6/1988 | Harrison | ................ | E05D 5/043 16/254 |
| 4,887,949 A | 12/1989 | Dimmick, III et al. | | |
| 4,971,496 A * | 11/1990 | Scholz | ................... | B64C 1/066 411/105 |
| 6,257,813 B1 * | 7/2001 | Tanimura | ................ | B23P 19/06 411/119 |
| 7,674,080 B2 * | 3/2010 | Agg | ...................... | F16B 39/101 411/121 |
| 7,708,510 B2 * | 5/2010 | Reimler | .................. | F16B 37/14 24/455 |
| 8,347,635 B2 * | 1/2013 | Durocher | .............. | F01D 25/162 29/464 |
| 8,353,649 B2 * | 1/2013 | Csik | ...................... | F16B 37/045 411/108 |
| 9,796,056 B2 * | 10/2017 | Snyder | .................... | B23P 11/00 |
| 2009/0044482 A1 | 2/2009 | Tooman | | |
| 2011/0138706 A1 | 6/2011 | Voss | | |
| 2014/0311068 A1* | 10/2014 | Takagi | ................ | E04D 13/1407 52/295 |

FOREIGN PATENT DOCUMENTS

WO    2011047723 A1    4/2011
WO    WO 2011/047723 A1    4/2011

* cited by examiner

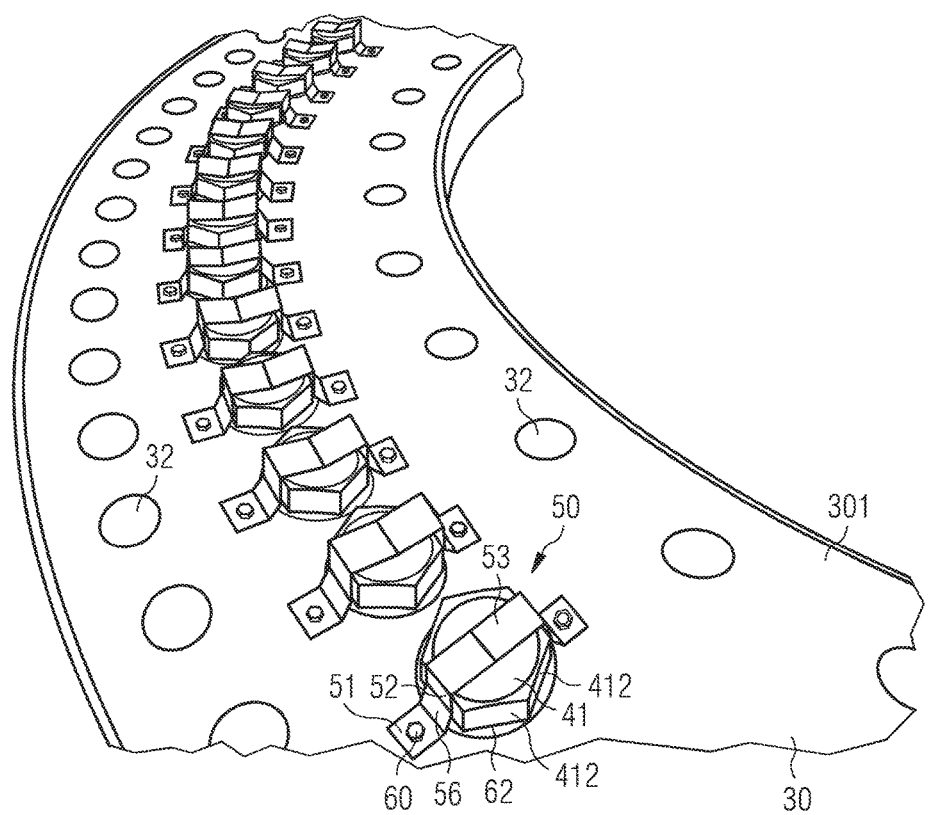

BOLT CONNECTION FOR A TOWER OF A WIND TURBINE

CROSS-REFERENCE TO RELATED APPLICATION

This application claims priority to European application No. 16181486.8 having a filing date of Jul. 27, 2016, the entire contents of which are hereby incorporated by reference.

FIELD OF TECHNOLOGY

The following relates to a bolt connection of a tower for a wind turbine. Furthermore, the disclosed relates to a wind turbine comprising a tower and a foundation, wherein the tower is attached to the foundation by a bolt connection.

BACKGROUND

Due to the considerable loads that a tower of a wind turbine experiences during its lifetime, the tower needs to be firmly attached to the foundation of the wind turbine. This connection between the tower and the foundation is typically realized by a plurality of bolts. A flange is often situated on top of the foundation. The bolt connection then connects this flange with the bottom end of the tower.

Conventionally, the bottom end of the tower also comprises a flange, which corresponds to the flange which is present on the foundation. The foundation may be made of concrete and the flange which connects the foundation with the bottom end of the tower is placed in liquid concrete. In other words, the concrete has not yet solidified.

In the case that the flange connects the bottom end of the tower via bolts these bolts are typically arranged such that the bolt head is at the bottom, i.e. facing the foundation. After solidification of the concrete, a nut or a similar fastening element tightens the bolt at the side which is facing the bottom end of the tower.

In the described approach of connecting the tower with the foundation, the bolt head is surrounded by liquid concrete during a certain time period. This leads to the problem that concrete or grout could enter into the space between the bolt head and the flange.

This problem has been addressed in the international patent application WO 2011/047723 A1. Therein, it is proposed to provide a disc or cover to a nut cage, wherein the nut cage surrounds the nut which is at the bottom side of the flange. Such a covered nut cage claims to be able to reduce the risk for grout or concrete entering the space between the bolt head and the base flange.

This solution, however, has the drawback that it requires a relatively complex and costly provision of a covered nut cage.

Therefore, there exists the desire to provide a more simple and inexpensive way of reducing the risk that impurities such as grout or concrete enters the space between a bolt head and a flange of a bolt connection.

SUMMARY

An aspect relates to a bolt connection of a tower for a wind turbine, wherein the bolt connection comprises a tower base module with a tower flange, a base flange for connecting the tower base module with the foundation, and a bolt which extends through the traverse bore of the base flange. The tower flange forms the bottom end of the tower. The base flange comprises the traverse bore. The bolt comprises a bolt head which is arranged at the bottom side of the base flange facing the foundation. Furthermore, the bolt connection comprises a clamping element which at least partially covers the bolt head. The clamping element presses the bolt head against the bottom side of the base flange.

A key aspect of the embodiments of the present invention is that a simple and efficient concept to prevent impurities entering the space between the bolt head and the base flange is provided herewith. In contrast to the known art this is achieved in a simple and cost efficient manner by providing a clamping element which is able to exert a force on the bolt head. In other words, the bolt head is pressed, i.e. pushed against or towards the bottom side of the base flange.

A further advantage of the clamping element as described in this patent application is the prevention of rotation of the bolt head when the nut of the bolt connection is tightened. This effect may also be described as a prevention or minimization of any torsional movement of the bolt head. This advantage is particularly realized in the case that at least some of the lateral surfaces of the clamping element cover at least some of the lateral surfaces of the bolt head.

Another advantage of the clamping element in connection with the bolt connection of embodiments of this invention is that the bolt head is fixed with regard to any displacement of the bolt head in the direction of the longitudinal axis of the bolt. This may also be described as a prevention or minimization of any vertical displacement of the bolt.

In an embodiment of the invention, the bolt head comprises an end face and one or more lateral surfaces, wherein the end face faces a way from the bottom side of the base flange.

In contrast to the lateral surfaces, i.e. the side surfaces, the end face characterizes the part of the bolt head which connect the lateral surfaces. In the set up according to embodiments of the invention, the bolt which extends through the traverse bore of the base flange is arranged such with regard to the base flange and the tower base module that the bolt head of the bolt is at the bottom.

In other words, the bolt head as a whole is facing the foundation of the wind turbine. Concentrating on the bolt head alone, the bolt head is arranged such with regard to the base flange and the foundation that the end face is facing the foundation. In other words, the end face of the bolt head faces away from the bottom side of the base flange. An advantage of a bolt head which comprises distinct side surfaces and a distinct end face is that the clamping device can be arranged and adapted to the bolt head in an easy manner.

The clamping element may comprise an attachment section. The attachment section has the function of providing means or a device for attaching the clamping element to the bottom side of the base flange. The clamping element may furthermore comprise one or more lateral surfaces for covering the one or more lateral surfaces of the bolt head. Additionally, the clamping element may comprise an end face for covering the end face of the bolt head.

Descriptively speaking, the clamping element is advantageously designed and configured such that its shape is adapted to the shape and design of the bolt head. Consequently, the clamping element also features side surfaces, i.e. lateral surfaces, and/or features a front face, i.e. an end face.

In order to most efficiently apply a force which is pressing the bolt head against the bottom side of the base flange, the end face of the clamping element may actually cover at least a part of the end face of the bolt head.

Note that, in general, only some, but not necessarily all lateral surfaces of the bolt head may be at least partially covered by the clamping element.

Alternatively, all lateral surfaces of the bolt head may be at least partially covered by the clamping element. Covering the bolt head completely has the advantage that the bolt head is firmly fixed and any rotational movement of the bolt head is efficiently prevented. Such a prevention of any rotational movement of the bolt head with regard to the base flange may, however, also be achieved by only covering one, two or more lateral surfaces.

In another embodiment of the invention, the end face of the clamping element comprises an indentation for exerting compressive forces on the bolt head. In other words, the clamping element may comprise a kink in the end face for applying forces to press, i.e. to push the bolt head to the bottom side of the base flange.

Note that, advantageously, the indentation of the end face of the clamping element is designed such that a certain pre-tensioning or pre-compression is present when the clamping element is attached to the base flange and the bolt head.

Note that the provision of an indentation in the end face of the clamping element is only one option to realize the clamping function of the clamping element. Any other ways of realizing the clamping mechanism may also be used and implemented.

In another embodiment of the invention, the at least one lateral surface of the clamping element comprises an angled inclination.

Such an angled inclination has the advantage that space for a washer or similar is provided, wherein the washer is provided and foreseen to be arranged between the bolt head and the bottom side of the base flange. In the case of a washer which has a diameter which is not greater than the diameter of the bolt head such an angled inclination may not be necessary. However, in the more typical case that the diameter of the washer is greater than the diameter of the bolt head, the clamping element fits better with the bolt head and the whole arrangement if there is enough space for the washer between the bolt head and the bottom side of the base flange.

Such an inclined lateral surface of the clamping element may comprise an angle of 45° for example. Furthermore, the angled inclination may cover the half of the lateral surface but may alternatively also just cover a small part close to the attachment section of the clamping element.

In a particular embodiment of the invention, the bolt head has six lateral surfaces, resulting in a substantially hexagonal cross section as viewed in a plane perpendicular to the longitudinal axis of the bolt. In this example, advantageously at least two of the lateral surfaces are covered with the clamping element.

Such a hexagonal bolt head is a standard type of a bolt head and the use of such a standard bolt head has the advantage that standard bolts with standard bolt heads can be used. In this case at least two, but also four or, for example, six lateral surface may be covered by the clamping element.

The clamping element may for example be configured as a bracket. That means that the lateral surfaces and the end face of the clamping element are relatively thin and are configured and designed as plates. This is advantageous in order to save material and space and also to form the clamping element such that compressive forces can be applied to the bolt head.

Advantageously, the bolt connection further comprises attachment bolts for attaching the clamping element to the base flange via the attachment section of the clamping element. These attachment bolts obviously may be designed much smaller and less robust than the bolt of which the bolt head needs to be pressed or pushed against the base flange. By using appropriate attachment bores, the attachments bolts may easily be attached and screwed into the base flange.

In practice, it is advantageous to provide a plurality of bolts and a plurality of corresponding traverse bores, wherein each of the bolts and the traverse bores realize a bolt connection according to the embodiments described above. This plurality of bolts may, for example, be arranged in an annular manner, in particular in the typical case that the base flange is designed as a ring. An amount of 50 or even 100 bolts is not uncommon for large wind turbine towers to be connected with the foundation of the wind turbine.

The following is further directed towards a wind turbine comprising a tower and a foundation wherein the tower is attached to the foundation by means of a bolt connection, in particular a plurality of bolt connections, as described above.

BRIEF DESCRIPTION

Some of the embodiments will be described in detail, with reference to the following figures, wherein like designations denote like members, wherein:

FIG. 4 shows a view onto the bottom side of the base flange with bolt connections according to embodiments of the invention.

DETAILED DESCRIPTION

Figure 1:
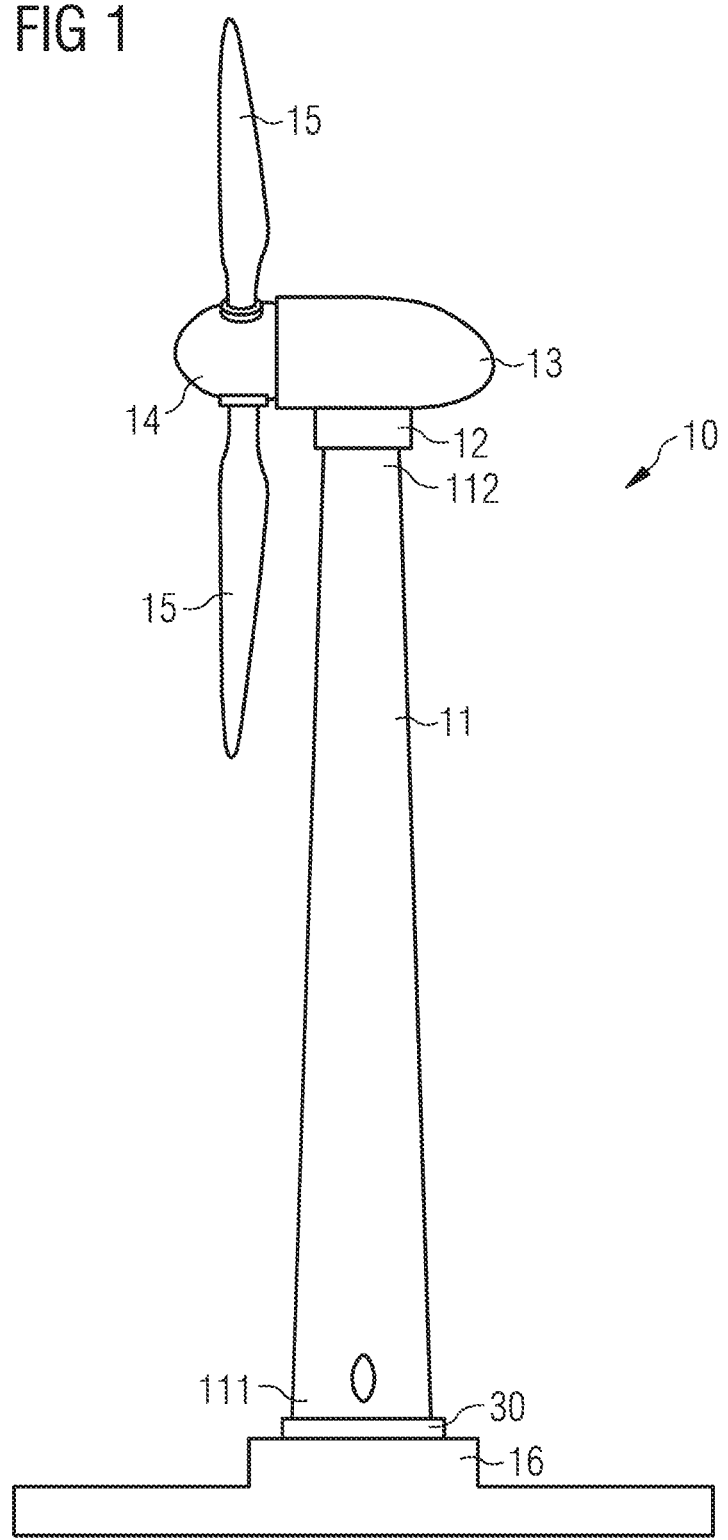
FIG. 1 shows a wind turbine.

The illustration in the drawing is in schematic form. It is noted that in different figures similar or identical elements may be provided with the same reference signs.

FIG. 1 shows a wind turbine 10. The wind turbine 10 comprises a tower 11 with a bottom end 111 and a top end 112. At the bottom end 111 of the tower 11, there is provided a base flange 30 which is connected to the tower 11. The base flange 30 is also connected to a foundation 16. Therefore, it can also be stated that the tower 11 of the wind turbine 10 is attached or connected to the foundation 16 of the wind turbine 10 via the base flange 30.

At the top end 112 of the tower 11, a yaw bearing 12 rotatable connects the tower 11 with a nacelle 13 of the wind turbine 10. The nacelle 13 accommodates the generator and parts of the rotor of the wind turbine 10. The yaw bearing 12 enables a rotational movement about an axis which is substantially parallel to the longitudinal axis of the tower 11. This axis is commonly referred to as the yaw axis.

The nacelle 13 is connected with a hub 14. The hub 14 is rotatable with regard to the nacelle 13. The hub 14 may be seen as a part of the rotor. A plurality of rotor blades 15 are mounted to the hub 14. In the example as shown in FIG. 1, the wind turbine 10 comprises three rotor blades 15 of which two rotor blades 15 are visible in FIG. 1.

Figure 2:
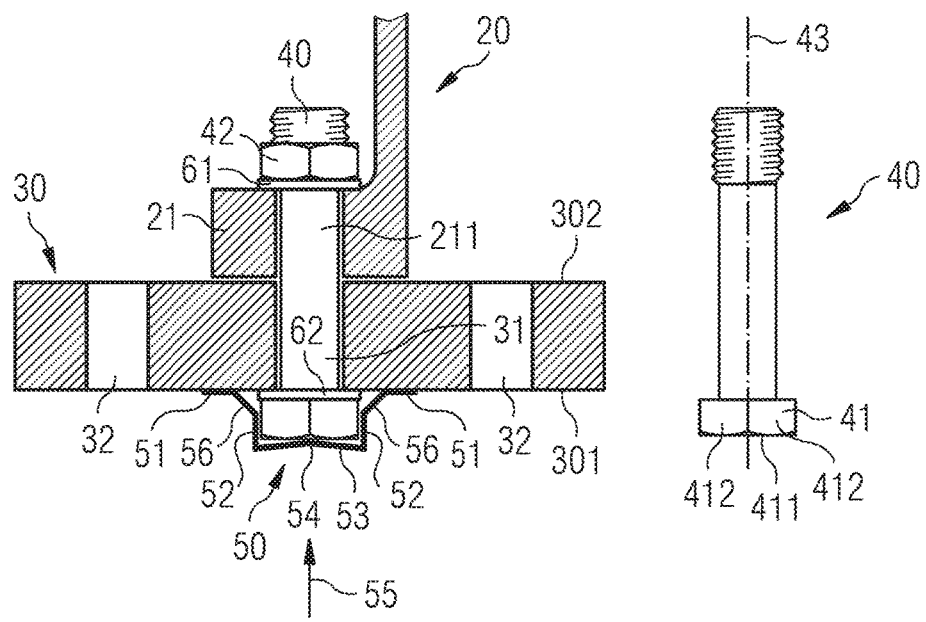
FIG. 2 shows a bolt connection with a clamping element according to embodiments of the invention.

FIG. 2 focuses on the connection of the tower 11 with the foundation 16. Note that the foundation 16 itself is not shown in FIG. 2, for the sake of clarity.

It can be seen that the tower 11 is represented by a tower base module 20 which comprises an "extension" at its bottom side. This extension is referred to as the tower flange 21. The tower base module 20 may be one of several modules or segments of the tower 11. The provision of a tower 11 comprising several segments is preferred in the case of large towers exceeding a length of fifty meters. The tower base module 20 may, for example, have a length of five meters to ten meters. The tower flange 21 comprises a traverse bore 211. The traverse bore 211 of the tower flange 21 is arranged and prepared for receiving the bolt 40 of the bolt connection between the tower base module 20 and the base flange 30. For this purpose, the base flange 30 also comprises a traverse bore which is referenced by the reference sign 31 in the figures. The traverse bore 31 of the base flange 30 is arranged and prepared to receive the bolt 40. Preferably, the traverse bolt 31 is aligned with a traverse bore 211 of the tower flange 21.

The right side of FIG. 2 illustrates a bolt 40 as it could exemplarily be used in the inventive bolt connection. As illustrated, the bolt 40 features a longitudinal axis 43, a bolt head 41 at one end, and a threaded part at the other end. The bolt head 41 of the bolt 40 has exemplarily six lateral surfaces 412, two of which are visible in FIG. 2. There can also be seen the end face 411 of the bolt head 41.

At the left side of FIG. 2, the bolt 40 is inserted into the traverse bores 31, 211 of the base flange 30 and the tower flange 21, respectively. The bolt 40 is tightened with a nut 42. Furthermore, there are provided a first washer 61 between the nut 42 and the tower flange 21, and a second washer 62 between the bolt head 41 and the bottom side 301 of the base flange 30. These washers 61, 62 facilitate a durable tightening of the bolt 40.

FIG. 2 also illustrates a clamping element 50 which covers the bolt head 41 of the bolt 40. The clamping element 50 comprises two attachment sections 51, one on the left side and one on the right side. Furthermore, it comprises two lateral surfaces 52, again one on the left side and one on the right side. Furthermore, the clamping element 50 comprises an end face 52 with an indentation 54 in the center area of the end face 53. This indentation enables a compressive force of which the direction is illustrated by the arrow 55. In other words, the clamping element 50 applies a compressive force which pushes, i.e. presses the bolt head 41 towards the bottom side 301 of the base flange 30. This has the technical effect that entering of grout or other impurities is minimized or even completely eliminated once that the bolt connection is surrounded by liquid concrete for example.

Finally note the further traverse bores 31 of which two of them are illustrated in FIG. 2 and which serve as bores for inserting bolts which connect the base flange 30 with the foundation 16.

Figure 3:
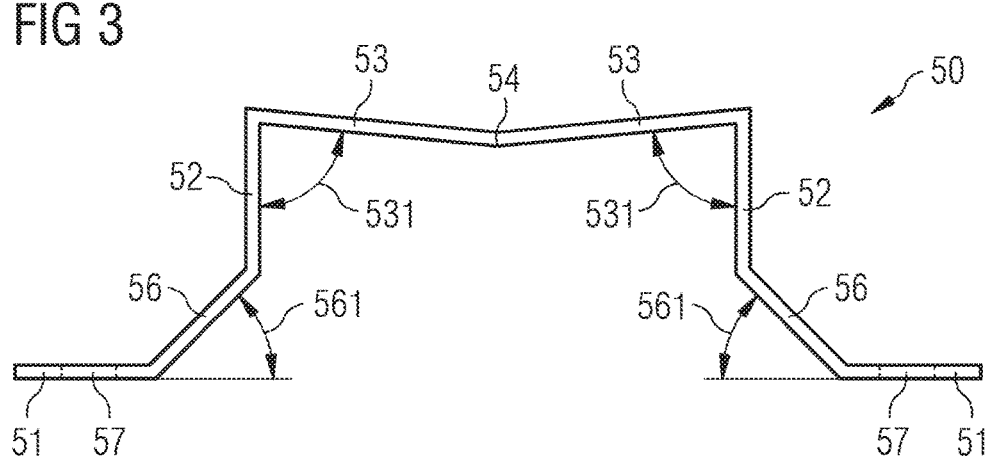
FIG. 3 shows an example of such a clamping element.

FIG. 3 shows an exemplary clamping element 50. In particular, FIG. 3 shows a cross sectional view of such a clamping element 50. The clamping element 50 comprises two attachment sections 51, one depicted on the left side of FIG. 3, one depicted on the right side of FIG. 3. Each of the attachment sections 51 comprises an attachment bore 57. The attachment bores 57 are destined for providing a hole for inserting corresponding attachment bolts (not shown).

Furthermore, the clamping element 50 comprises two lateral surfaces 52, wherein the lateral surfaces 52 are connected with the attachment sections 51 via an inclination 56. The inclination 56 is included for facilitating the insertion of a washer between the bolt head of the bolt and the surface of the base flange 30. In the example of FIG. 3, the inclination 56 comprises an inclination angle 561 of approximately forty-five degree.

Furthermore, the clamping element 50 comprises an end face 53, connecting both lateral surfaces 52 with each other. The end face 53 comprises an indentation 54 for applying a clamping force, in particular a compressive force of the clamping element 50 against the bolt head of the bolt. In the example of FIG. 3, the indentation 54 is approximately located at the center of the end face 53. Such an indentation can also be referred to as a kink in the end face 53.

The particular shape, in particular the depth of the indentation 54, is chosen according to the dimensions of the clamping element 50 and the corresponding bolt head. For instance, an end face angle 531, which is defined as the angle between the lateral surface 52 and the end face 53, would be smaller than ninety degree. In the example as illustrated in FIG. 3, the end face angle 531 is approximately eighty degree.

Note that, in general, other mechanisms for enabling a clamping effect of the clamping element with regard to the bolt head of the bolt are possible. Also note that the size and angle of the inclination may also be varied according to the particular specification and dimension of the washer to be used in connection with the bolt connection.

FIG. 4 illustrates a perspective view of several bolt connections. In particular, a view on the bottom side 301 of the base flange 30 of a wind turbine is shown. It can be seen that the base flange 30 comprises a plurality of radially inner bores, which are referred to as to further traverse bores 32. Similar to the radially inner ring of further traverse bores 32, there are provided a radially outer ring of another set of further traverse bores 32. The further traverse bores 32 are arranged and prepared for a connection between the base flange 30 and a foundation of a wind turbine. Such a connection is preferably also realized by a set of bolts. However, this connection between the base flange 30 and the foundation of the wind turbine is not the content of embodiments of this invention.

Approximately at the center part of the ring shaped base flange 30, there are provided the bolts of which the respective bolt heads are visible. The bolt heads are referred to by the reference sign 41. In a particular embodiment as illustrated in FIG. 4, each bolt head 41 comprises six lateral surfaces 412. Two of the six lateral surfaces 412 are covered by the clamping element 50. The clamping element substantially comprises the characteristics as shown in the cross sectional view of FIG. 3. Thus, it comprises attachment sections 51, lateral surfaces 52, an end face 53 and an indentation 54, the latter one only faintly be visible in FIG. 4. Additionally, the clamping element 50 comprises an inclination 56 in order to facilitate accommodation of a washer, in particular the second washer 62.

In FIG. 4 there is furthermore depicted attachment bolts 60 of which two of them connect one clamping element 50 with the base flange 30. In the perspective view of FIG. 4 it can be well discerned that the indentation 54 is able to exert compressive forces onto the bolt head 41.

In another embodiment of the invention, the base flange 30 may be segmented in several base flange segments. This has the advantage that transportation and also manufacturing of the base flange is facilitated.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

The invention claimed is:

1. A bolt connection of a tower for a wind turbine, the bolt connection comprising:
   a tower base module with a tower flange, wherein the tower flange forms the bottom end of the tower,
   a base flange for connecting the tower base module with a foundation, wherein the base flange comprises a traverse bore, and
   a bolt which extends through the traverse bore of the base flange, wherein the bolt comprises a bolt head which is arranged at the bottom side of the base flange facing the foundation,
   wherein the bolt connection further comprises a clamping element which at least partially covers the bolt head, wherein the clamping element comprises one or more lateral surfaces, wherein at least one of the lateral surfaces comprise a first section having a vertical orientation, a second section having an angled inclination, wherein the slope of the second section is constant throughout and different than the slope of the first section, and a third section having a horizontal orientation, the third section contacting the base flange, wherein the clamping element is attached to the base flange by a first attachment bolt and a second attachment bolt, wherein the first attachment bolt is located on an inner radius of the base flange and the second attachment bolt is located on an outer radius of the base flange, and
   the clamping element presses the bolt head against the bottom side of the base flange such that liquid concrete or grout cannot enter into the space between the bolt head and the flange while connecting the tower with a foundation.

2. The bolt connection according to claim 1, wherein the bolt head comprises an end face and one or more lateral surfaces, the end face facing away from the bottom side of the base flange, and
   the clamping element comprises an attachment section for attachment of the clamping element to the bottom side of the base flange, the one or more lateral surfaces for at least partially covering the one or more lateral surfaces of the bolt head, and an end face for at least partially covering the end face of the bolt head.

3. The bolt connection according to claim 1, wherein the end face of the clamping element comprises an indentation for exerting compressive forces on the bolt head.

4. The bolt connection according to claim 2, wherein the at least one of the lateral surfaces of the clamping element comprises the angled inclination section such that a washer which has a diameter which is greater than the diameter of the bolt head may be fit between the bolt head and the base flange.

5. The bolt connection according to claim 1, wherein the bolt head has six lateral surfaces, resulting in a substantially hexagonal cross section in a plane perpendicular to the longitudinal axis of the bolt, and
   at least two of the lateral surfaces are covered with the clamping element.

6. The bolt connection according to claim 1, wherein the clamping element is configured as a bracket.

7. The bolt connection according to claim 1, wherein the bolt connection further comprises attachment bolts for attaching the clamping element to the base flange via the attachment section of the clamping element.

8. The bolt connection according to claim 1, wherein the bolt connection comprises a plurality of bolts and a plurality of corresponding transverse bores.

9. The bolt connection according to claim 1, wherein the tower flange has an annular shape, and
   the transverse bores are arranged circumferentially at the tower flange.

10. A wind turbine comprising:
    a tower and a foundation, wherein the tower is attached to the foundation by a bolt connection
    a tower base module with a tower flange, wherein the tower flange forms the bottom end of the tower,
    a base flange for connecting the tower base module with a foundation, wherein the base flange comprises a traverse bore, and
    a bolt which extends through the traverse bore of the base flange, wherein the bolt comprises a bolt head which is arranged at the bottom side of the base flange facing the foundation,
    wherein the bolt connection further comprises a clamping element which at least partially covers the bolt head, wherein the clamping element comprises one or more lateral surfaces, wherein at least one of the lateral surfaces a first section having a vertical orientation a second section having an angled inclination, wherein the slope of the second section is constant throughout and different than the slope of the first section, and a third section having a horizontal orientation, the third section contacting the base flange wherein the clamping element is attached to the base flange by a first attachment bolt and a second attachment bolt, wherein the first attachment bolt is located on an inner radius of the base flange and the second attachment bolt is located on an outer radius of the base flange, and
    the clamping element presses the bolt head against the bottom side of the base flange.

11. A bolt connection of a tower for a wind turbine, the bolt connection comprising:
    a tower base module with a tower flange, wherein the tower flange forms the bottom end of the tower,
    a base flange for connecting the tower base module with a foundation, wherein the base flange comprises a traverse bore, and
    a bolt which extends through the traverse bore of the base flange, wherein the bolt comprises a bolt head which is arranged at the bottom side of the base flange facing the foundation,
    wherein the bolt connection further comprises a clamping element which at least partially covers the bolt head, and
    the clamping element presses the bolt head against the bottom side of the base flange, wherein the bolt head comprises an end face and one or more lateral surfaces, the end face facing away from the bottom side of the base flange, and
    the clamping element comprises an attachment section for attachment of the clamping element to the bottom side of the base flange, one or more lateral surfaces for at least partially covering the one or more lateral surfaces of the bolt head, and an end face for at least partially covering the end face of the bolt head and wherein at least one of the lateral surfaces of the clamping element comprises a first section having a vertical orientation and a second section having a horizontal orientation, the second section contacting the base flange, wherein the first section and the second section are connected by a third section having an angled inclination, wherein the slope of the third section is constant throughout and different than the slope of the first section, such that a washer which has a diameter which is greater than the diameter of the bolt head may be fit between the bolt head and the base flange wherein the clamping element is attached to the base flange by a first attachment bolt and a second attachment bolt, wherein the first attachment bolt is located on an inner radius of the base flange and the second attachment bolt is located on an outer radius of the base flange.

\* \* \* \* \*